(12) United States Patent
Ducellier et al.

(10) Patent No.: US 7,321,704 B2
(45) Date of Patent: Jan. 22, 2008

(54) WAVELENGTH CROSS CONNECT WITH PER PORT PERFORMANCE CHARACTERISTICS

(75) Inventors: Thomas Ducellier, Ottawa (CA); Alan Hnatiw, Stittsville (CA); Puja Sehgal, La Salle (CA); Eliseo Ranalli, Irvine, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/483,106

(22) Filed: Jul. 10, 2006

(65) Prior Publication Data

US 2007/0009204 A1 Jan. 11, 2007

Related U.S. Application Data

(60) Provisional application No. 60/697,385, filed on Jul. 8, 2005.

(51) Int. Cl.
*G02B 6/42* (2006.01)

(52) U.S. Cl. .............................. 385/15; 385/16; 385/17; 385/18; 385/19; 398/79; 398/82; 398/83; 398/84

(58) Field of Classification Search ............ 385/15–19, 385/24, 37, 46; 359/298; 398/78, 82–84
See application file for complete search history.

(56) References Cited

U.S. PATENT DOCUMENTS

| | | | | |
|---|---|---|---|---|
| 6,049,640 | A | * | 4/2000 | Doerr .......................... 385/15 |
| 6,263,123 | B1 | * | 7/2001 | Bishop et al. ................. 385/15 |
| 6,263,127 | B1 | * | 7/2001 | Dragone et al. .............. 385/24 |
| 6,775,432 | B2 | * | 8/2004 | Basu ............................ 385/24 |
| 2002/0176151 | A1 | * | 11/2002 | Moon et al. ................. 359/298 |
| 2006/0067611 | A1 | * | 3/2006 | Frisken et al. ................ 385/16 |

\* cited by examiner

*Primary Examiner*—Brian Healy
*Assistant Examiner*—Guy G Anderson
(74) *Attorney, Agent, or Firm*—Allen, Dyer, Doppelt, Milbrath & Gilchrist, P.A.

(57) ABSTRACT

A wavelength cross connect is provided in which there is a dispersive arrangement per port for each input port and each output port. Some of the dispersive arrangements have differing characteristics so as to result in different performances at the ports. The dispersive arrangements can differ in the selection of different dispersive elements or differing coupling optics. A particular implementation features a first set of waveguide dispersive elements having first performance characteristics, and a second set of waveguide dispersive elements having second performance characteristics.

20 Claims, 10 Drawing Sheets

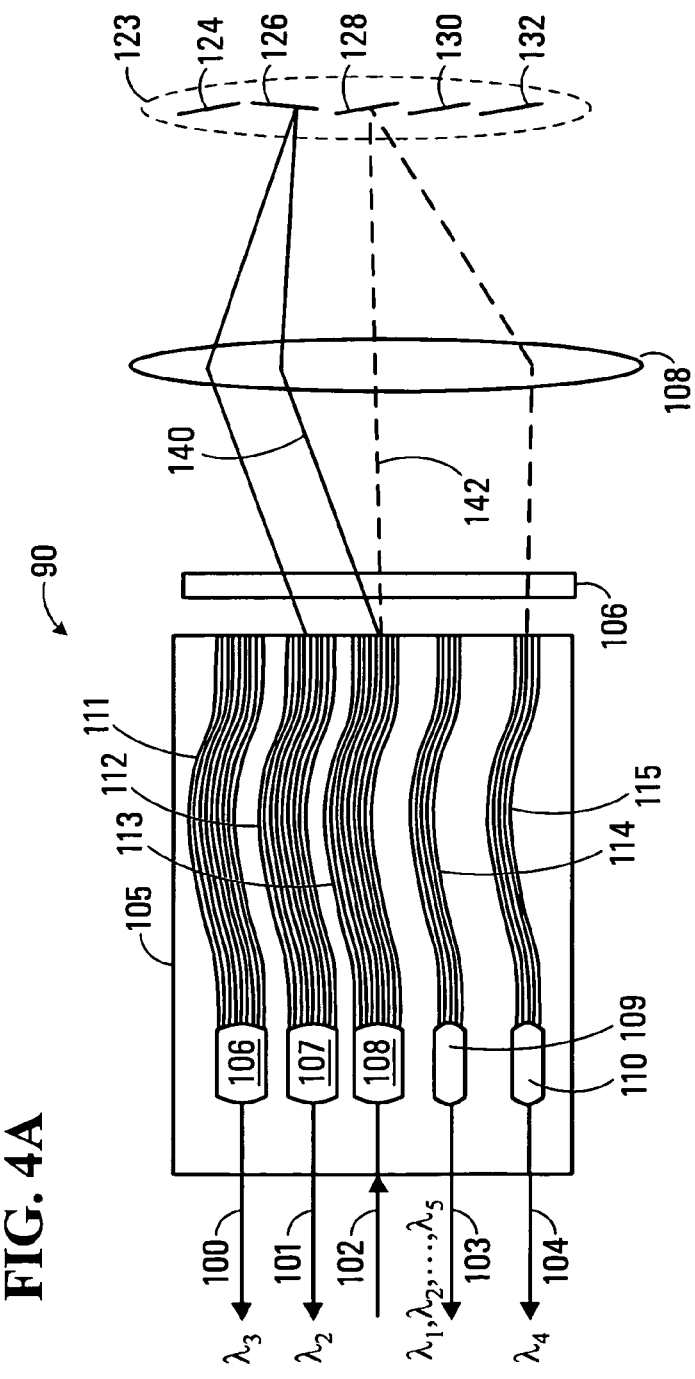
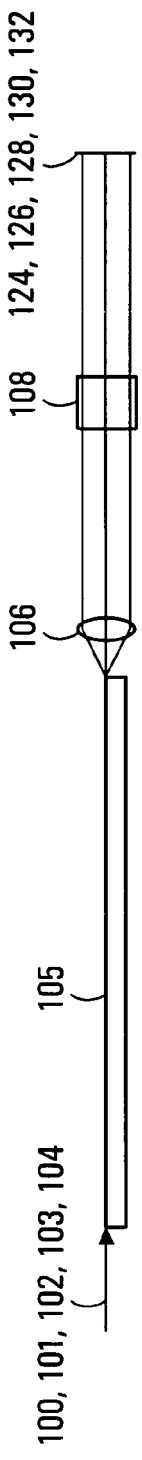
FIG. 4A
FIG. 4B

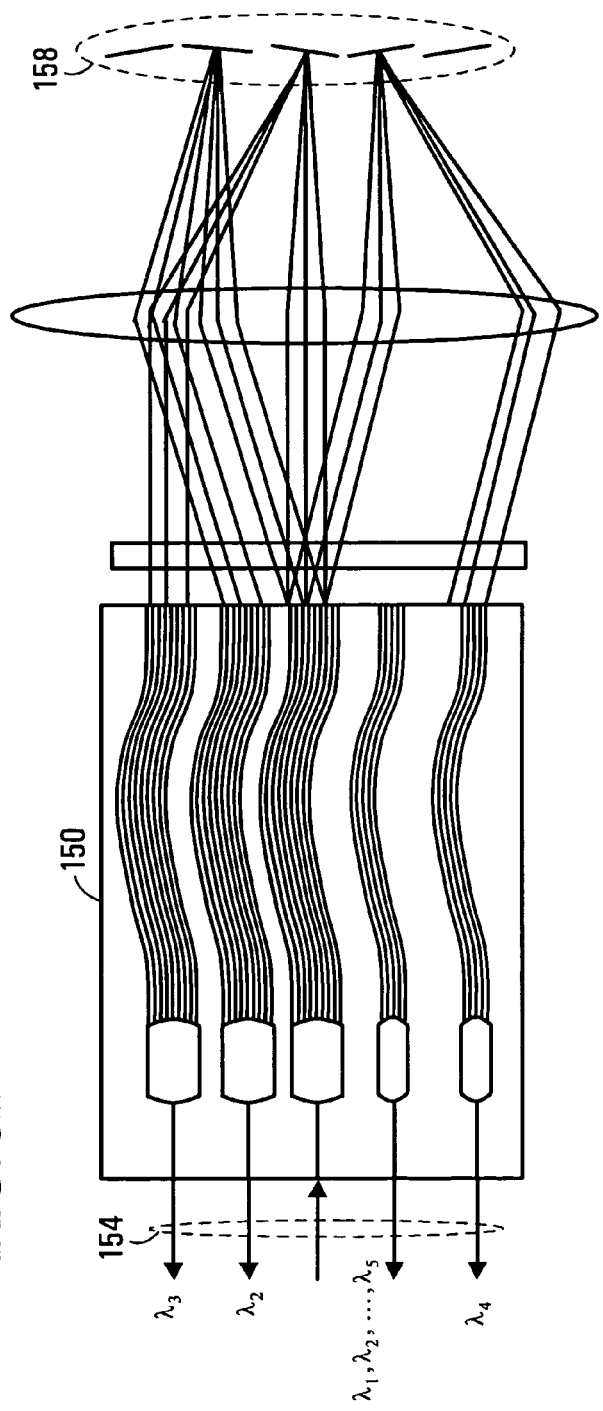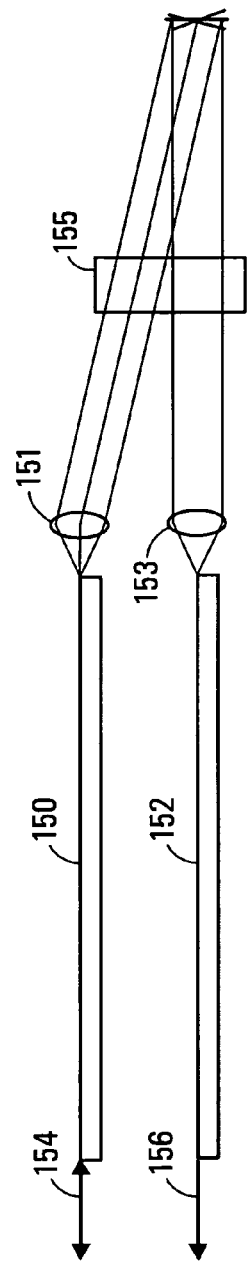
FIG. 5A
FIG. 5B

WAVELENGTH CROSS CONNECT WITH PER PORT PERFORMANCE CHARACTERISTICS

RELATED APPLICATIONS

This application claim the benefit of prior U.S. Provisional Application No. 60/697,385 filed Jul. 8, 2005 hereby incorporated by reference in its entirety.

FIELD OF THE INVENTION

This invention relates to the field of DWDM fibre optics telecommunications and in particular to the field of all-optical switching.

BACKGROUND OF THE INVENTION

The advent of DWDM fibre optics telecommunications systems in the early 1990s have enabled a dramatic increase in the transmission capacity over point-to-point communication links. This was achieved through multiplexing of a large number of individually modulated light beams of different wavelengths onto the same optical fibre. Typical systems installed today would have 100 or more independent channels precisely aligned onto an ITU-T standardized grid at 100 GHz, 50 GHz or even narrower channel spacing. With modulation speeds of routinely 10 Gb/s and attaining 40 Gb/s in laboratory experiments, it is not unusual to obtain aggregated capacities in the order of several terabits per second of information being transmitted onto a single optical fibre. At the same time, electrical switching capacities have been growing at a much slower rate, with current largest electrical matrices limited to typically about 1 Tb/s in a single stage. Furthermore, in most of the switching nodes, a large fraction—typically 70%—of the traffic is distant traffic that just travels through the node. It is therefore advantageous to have optical devices with large pass-through capacity and local tunable drop capability. This device is referred to in the literature as a Reconfigurable Optical Add-Drop Module or ROADM (J. Lacey, Optical Fiber Communication conference, WT, Anaheim, 2002).

A ROADM usually includes an input port for receiving a DWDM signal, an output port for the express traffic and at least one add or drop port(s) for adding or dropping wavelength channels for local processing. This is usually realized through the subsequent steps of demultiplexing the incoming DWDM input, providing an array of switching means to route the individual channels to either the output express port or the add/drop port, and multiplexing the express channels onto a single output port. Some ROADM have multiplexed add/drop ports, some provide fully demultiplexed add/drop ports.

It is known to one skilled in the art that multiplexing/demultiplexing technologies can be done in many different ways. Serial filter embodiments (Fibre Bragg Grating, Thin Film Filters, fibre Mach Zehnder cascade, birefringent filters, etc.) are usually limited in number of wavelength channels due to insertion loss impairments. Therefore, the two solutions of choice currently being developed for ROADM applications with a large number of wavelength channels are based on parallel wavelength filtering: either free-space embodiments using bulk diffraction gratings or waveguide embodiments using AWG (Arrayed Waveguide Gratings).

Free-space optics implementations usually comprise optical fibre ports, lens elements, one bulk diffraction grating and an array of switching means. For example, Corning Inc. from Corning, N.Y., offered such a device based on a liquid-crystal routing element under the trademark Pure-Path™. Although showing high optical performances, free-space optics solutions are typically expensive, due to extremely tight alignment tolerances of multiple high precision optical elements. Furthermore, the relative positioning of these elements must be maintained over a wide range of environmental conditions requiring elaborate opto-mechanical designs.

Paper PD FB 7 presented at OFC'02 in March 2002 in Anaheim, Calif. provides a wavelength selective switch. The switch includes input coupling optics, routing elements, a main lens, and a single diffraction grating. Disadvantageously, in this embodiment, only a small part of the service of the diffraction grating lies in the focal plane of the main lens. This prevents light beams from all ports to stay in focus. Integrated optics solutions on the other hand have the potential to maintain the relative positioning of the different elements put onto the same substrate. There are various ways of performing parallel wavelength demultiplexing in waveguides, for example using AWG or using Echelle grating, the former being by far the more popular device due to the difficulty of manufacturing high precision diffraction gratings in waveguide substrates. Bragg gratings have also been employed for this purpose.

The AWG was invented by Dragone (C. Dragone, IEEE Photonics Technology Letters, Vol. 3, No. 9, pp. 812-815, September 1991) by combining a dispersive array of waveguides (M. K. Smit, Electronics Letters, Vol. 24, pp. 385-386, 1988) with input and output "star couplers" (C. Dragone, IEEE Photonics Technology Letters, Vol. 1, No. 8, pp. 241-243, August 1989). The AWG can work both as a DWDM demultiplexer and as a DWDM multiplexer, as taught by Dragone in U.S. Pat. No. 5,002,350 (March 1991).

An integrated optics ROADM could therefore be made using an input AWG to demultiplex the input DWDM stream, an array of switching means to route the demultiplexed channels to either an express path or the drop ports, and an output AWG to multiplex the output express DWDM stream. Due to the cyclic nature of the AWG's filtering function, it is possible to use only one AWG to perform the ROADM function with some loop back (O. Ishida et al., IEEE Photonics Technology Letters, Vol. 6, No. 10, pp. 1219-1221, October 1994). Typically, interconnects in an integrated optics ROADM are done primarily using guided way optics, for example using waveguides.

The routing elements can either be integrated onto the same substrate as the AWG or can be hybridized. All-integrated embodiments typically make use of thermo-optical switches (see for example C. R. Doerr et al., IEEE Photonics Technology Letters Volume 15, No. 1, January 2003, p 138 to 140), taking up a lot of substrate area and requiring careful heat management, eventually limiting its scalability. Integrated MEMS-waveguide solutions have also been proposed in the past, but the routing element is usually limited to 1×2 or 2×2, therefore also limiting scalability (M. Katayama et al., Optical Fibre Communication conference, WX4-1, Anaheim, 2001). It is known to a man skilled in the art that hybrid embodiments are possible in which AWG output waveguides are coupled to MEMS routing elements through a micro-lens array. However, this usually leads to poor spectral performance, i.e. no wide flat channel shape passband (R. Ryf et al., European Conference on Optical Communications, PD B.1.5, Amsterdam, 2001).

Applicants' published application WO2003/098856, entitled "RECONFIGURABLE OPTICAL ADD-DROP MODULE, SYSTEM AND METHOD" teaches a ROADM that addresses many of the above issues. Among other improvements, the design incorporates a dispersive element per port.

SUMMARY OF THE INVENTION

According to a broad aspect, the invention provides a wavelength cross connect comprising: a plurality of ports comprising at least one input port and at least one output port; for each input port, a respective dispersive arrangement; for each output port, a respective dispersive arrangement that multiplexes any wavelength signals re-directed towards the dispersive arrangement; a plurality of routing elements for re-directing wavelength signals between the dispersive arrangement(s) of the at least one input port and the dispersive arrangement(s) of the at least one output port; wherein at least two of the ports are configured to have differing performances through selection of respective dispersive arrangements having differing characteristics.

In some embodiments, for at least one input port, the respective dispersive arrangement is configured to demultiplex a multi-wavelength signal into a plurality of wavelength signals.

In some embodiments, the at least one output port comprises at least two output ports, and wherein at least two of the output ports are configured to have differing performances through selection of respective dispersive arrangements having differing characteristics.

In some embodiments, for each port, the respective dispersive arrangement comprises a dispersive element, and wherein at least two of the ports are configured to have differing performances through selection of dispersive elements having differing characteristics.

In some embodiments, for each port, the respective dispersive arrangement comprises a dispersive element and coupling optics coupling the port to the dispersive element; wherein at least two of the ports are configured to have differing performances through selection of coupling optics having differing characteristics.

In some embodiments, the at least two dispersive elements having different characteristics are selected from a group consisting of: gratings having at least two different orders; arrayed waveguide gratings having at least two different path length differences; arrayed waveguide gratings having at least two different waveguide spacings in a waveguide array output facet; bulk gratings having at least two different line/mm characteristics; arrayed waveguide gratings having at least two differing numbers of waveguides lit; bulk gratings having at least two differing numbers of grooves lit.

In some embodiments, the at least two coupling optics having different characteristics are selected from a group consisting of: lenses with different focal lengths; slab regions with different lengths; apertures clipping the beam; tapers changing beam dimensions; collimators changing beam dimensions; beamforming optics changing beam dimensions.

In some embodiments, the coupling optics comprise a slab waveguide per port, and the at least two different ports have differing performance characteristics by: providing slab waveguides that truncate a beam emitted in the front slab region in a waveguide dispersive element so that only the central portion of the beam couples to the dispersive element.

In some embodiments, the wavelength cross connect comprises a 1×(K+M) WSS design with 1 input port, K full resolution ports, and M reduced resolution ports, where K≧1, M≧1.

In some embodiments, the wavelength cross connect comprises a (K+M)×1 WSS design, with K full resolution input ports, M reduced resolution input ports, and a single output port, where K≧1, M≧1.

In some embodiments, the dispersive elements comprise a plurality of arrayed waveguide gratings implemented on a single waveguide device.

In some embodiments, the dispersive elements comprise a plurality of arrayed waveguide gratings implemented on two waveguide devices.

In some embodiments, the two waveguide devices comprise a first waveguide device having arrayed waveguide gratings with a first performance, and a second waveguide device having arrayed waveguide gratings with second performance different from said first performance.

In some embodiments, the first and second waveguide devices are substantially physically the same size, but with differing numbers of arrayed waveguide gratings on the two devices.

In some embodiments, the performances of the ports are such that at least one port is configured to process a DWDM multiplex and at least one port is configured to produce a reduced set of wavelength channels.

In some embodiments, the reduced set consists of a single wavelength channel.

In some embodiments, the wavelength cross connect further comprises: a lens system to optically connect the dispersive arrangements and the routing element; each dispersive arrangement is selected on a per port basis with a dispersive characteristic selected to compensate for aberations in the lens system.

In some embodiments, the wavelength cross connect further comprises: for each of at least one port, coupling optics and a detector, the coupling optics being configured to route part of the light being input/output at the port to the detector.

According to another broad aspect, the invention provides a wavelength cross connect comprising: a plurality of ports comprising at least one port that functions as both an input port and an output port; for each port, a respective dispersive arrangement; a plurality of routing elements for re-directing wavelength signals between ports; wherein for each port functioning as an input port, the respective dispersive arrangement performs a demultiplexing function on a respective multi-wavelength signal received at the input port; for each port functioning as an output port, the respective dispersive arrangement performs a remultiplexing function of any wavelength signals re-directed towards that output port by the routing elements; wherein at least two of the ports are configured to have differing performances through selection of respective dispersive arrangements having differing characteristics.

In some embodiments, the wavelength cross connect comprises a circulator for each port functioning as both an input port and an output port to separate input and output signals.

According to another broad aspect, the invention provides a wavelength cross connect comprising: a plurality of ports comprising at least one input port and at least one output port; for each input port, a respective dispersive arrangement; for each output port, a respective dispersive arrangement that multiplexes any wavelength signals re-directed towards the dispersive arrangement; for each of a plurality of wavelength channels, a respective beam processing elements for re-directing at least part of the wavelength channel between the dispersive arrangement(s) of the at least one input port and the dispersive arrangement(s) of the at least one output port; wherein at least two of the ports are configured to have differing performances through selection of respective dispersive arrangements having differing characteristics.

While the embodiments summarized above are all apparatuses, corresponding methods are also contemplated.

BRIEF DESCRIPTION OF THE DRAWINGS

Preferred embodiments of the invention will now be described with reference to the attached drawings in which:

FIGS. 4A and 4B are schematic diagrams of a WSS provided by an embodiment of the invention;

FIGS. 5A and 5B are schematic diagrams of a WSS provided by an embodiment of the invention;

DETAILED DESCRIPTION OF THE PREFERRED EMBODIMENTS

Figure 1:
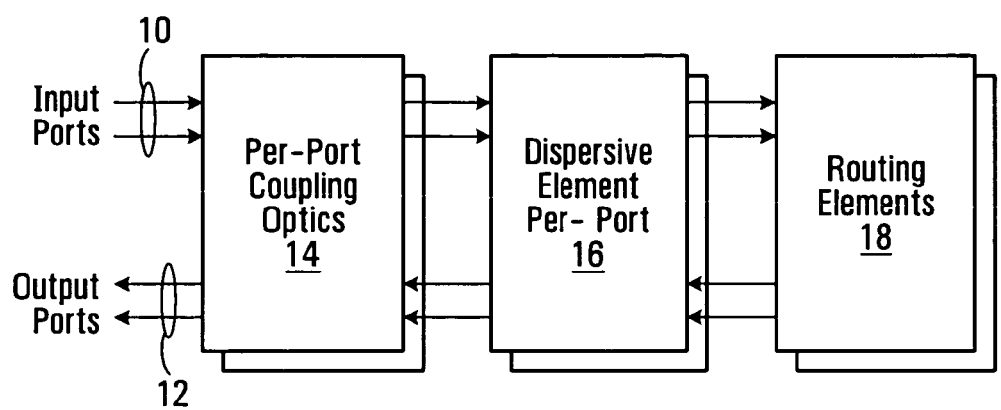
FIG. 1 is a block diagram of a wavelength cross connect provided by an embodiment of the invention.

FIG. 1 is a block diagram of a wavelength cross connect provided by an embodiment of the invention. The arrangement has a set of N input ports 10 (two shown, more generally at least one input port), and a set of M output ports 12 (two shown, more generally at least one output port, with at least two output ports in some embodiments). The ports can be in a single plane, or arranged in two dimensions. Per-port coupling optics are generally indicated at 14. There is a dispersive element per port, generally indicated at 16. Finally, there is a plurality of routing elements generally indicated at 18 for re-directing wavelength signals. If either N or M is equal to one, then the wavelength cross connect is a wavelength selective switch, a wavelength selective switch being a special case of a wavelength cross connect.

In operation, the port coupling optics 14 functions to couple light between the input and output ports 10,12 and their respective dispersive elements 16. For each input port, the dispersive element 16 performs dispersion of wavelength channels of an input signal such that wavelength channels of the input signal are demultiplexed and directed towards an appropriate routing element. The routing elements 18 redirect each wavelength channel back to one of the dispersive elements of one of the output ports, and all wavelength channels redirected to a given dispersive element are combined into an output signal at that output port.

The port coupling optics consist of any mechanism allowing an appropriate coupling of light between the ports and the dispersive elements. For example, they might be either discrete micro-optic coupling optics, or integrated slab waveguides. Specific examples are given below.

The dispersive elements may be discrete dispersive elements such as diffraction gratings, or they may be integrated dispersive elements such as arrayed waveguide gratings. They may be arranged in one dimension or two dimensions depending on the dimensionality of the input/output ports 10,12.

The routing elements consist of any elements capable of redirecting light on a per wavelength channel basis. These might be MEMs mirrors or liquid crystal cells for example. These might include transmissive and/or reflective redirection elements. These may redirect light in one or two dimensions depending on the arrangement of the input/output ports 10,12.

It is noted that depending on a given implementation, the order of the components shown in FIG. 1 may be slightly different. For example, in some embodiments, some or all of the routing elements may be transmissive. In such embodiments, some of the dispersive elements and some of the ports would be on the other side of the redirection elements. Furthermore, there may be additional components that are not shown such as bulk optical elements that participate in the routing of channels between the various components illustrated. Specific examples are provided below.

The ports collectively comprise at least two ports having differing performance characteristics. In a particular example, at least two output ports have differing performance characteristics. In a particular embodiment, the output ports collectively comprise at least one "low performance" port, and at least one "high performance" port. Low and high performance are terms defining performance relative to each other only. The high performance ports have better performance than the low performance ports.

In some embodiments, the per port performance is determined through appropriate selection of the per port dispersive elements, depending on the any number of factors, such as cost, performance and/or functionality to name a few examples. More specifically, the differing per port performance might be optical performance (insertion loss, channel bandwidth, isolation etc.). Functionality might include wavelength range blocking switching characteristics, hitless reconfiguration to name a few examples.

In some embodiments, the dispersive elements have different effective beamsizes to provide high performance ports (for example suitable for WSS applications requiring high performance, with wide flat passband, high port-to-port isolation and low insertion loss for maximum cascadability) and lower performance ports (for example suitable for local colourless service ports that can tolerate lower performance, for example in terms of isolation, channel passband or insertion loss trade-off). The effective beamsize can limit the number of grating lines lit in a traditional bulk diffraction grating system or the number of waveguides lit in a waveguide array based dispersive element.

In such an implementation, service ports can be configured to process a reduced number (for example four to eight) of wavelength channels, while the WSS ports are configured to process a DWDM multiplex by appropriate selection of the dispersive element order and resulting free spectral range.

In a particular implementation, the dispersive elements per port are arranged in multiple rows of dispersive elements with various dispersive properties, with the dispersive elements in a row having substantially the same dispersive properties. An example of this is described below with reference to FIGS. 6A, 6B and 6C. In that example, two rows of dispersive elements are provided in association with two rows of ports including a row of five high performance ports and a row of nine low performance ports.

Examples of parameters enabling the selection of performance on a per port basis for the dispersive elements are:

order of the grating;

path length difference in a waveguide array;

waveguide spacing in a waveguide array output facet or line/mm pitch for bulk grating;

number of waveguides lit in the waveguide array or number of grooves lit for bulk grating.

Note that the variation in the number of waveguides lit can be achieved by truncating a beam emitted in the front slab region in a waveguide dispersive element so that only the central portion of the beam couples to the waveguide array section. The slab length, input waveguide taper at the slab input and position of the waveguide in the array at the output of the slab region can all be varied to achieve customized beam sampling and customized beam size. Alternatively, the beam output at the exit facet of the waveguide array or at the exit of a bulk diffraction grating can also be apertured to effectively truncate the beam there.

In the above-described embodiments, the differing optical performance is achieved by providing different dispersive elements. In another embodiment, identical dispersive elements are provided, but optical properties of the coupling optics associated with each dispersive element differ so as to effectively change the dispersive properties of the coupling optics plus dispersive element combination. For example, an example of a bulk optical dispersive arrangement is a combination of a lens and a grating. The performance of such a dispersive arrangement can be changed by changing the focal length of each respective lens.

In the above described embodiment, the performance is varied through the provision of either different dispersive elements or different coupling optics. More generally, a dispersive arrangement per port is provided, and the performance is varied through the provision of one or more differences between the dispersive arrangements. Such a dispersive arrangement in all cases includes a dispersive element. In the example above, the dispersive arrangement also includes coupling optics but in the most general sense it may not. Examples of elements that might form part of such dispersive arrangements include lenses with different focal lengths, slab regions with different lengths, apertures clipping the beam, tapers changing beam dimensions, collimators changing beam dimensions, and beamforming optics changing beam dimensions etc.

In some embodiments, a lens system is provided to optically connect dispersive arrangements and dispersive elements. In some such embodiments, each dispersive arrangement is selected on a per port basis with a dispersive characteristic selected to compensate for aberations in the lens system. For example, in the embodiment of FIG. 4A described in detail below, each dispersive element 111 to 115 may be implemented to have a slightly different centre wavelength to compensate for spherical aberations of routing lens 108. Compensation for other aberations in this or other embodiments is possible by appropriate selection of the respective dispersive properties associated with each port.

Figure 2A:
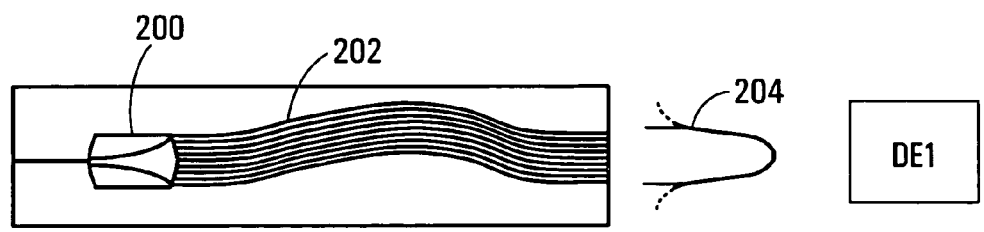
FIGS. 2A through 2C show various integrated dispersive arrangements with different performance characteristics.
Figure 2B:
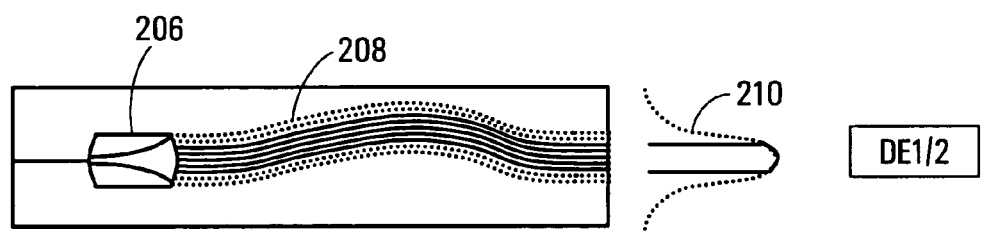
Figure 2C:
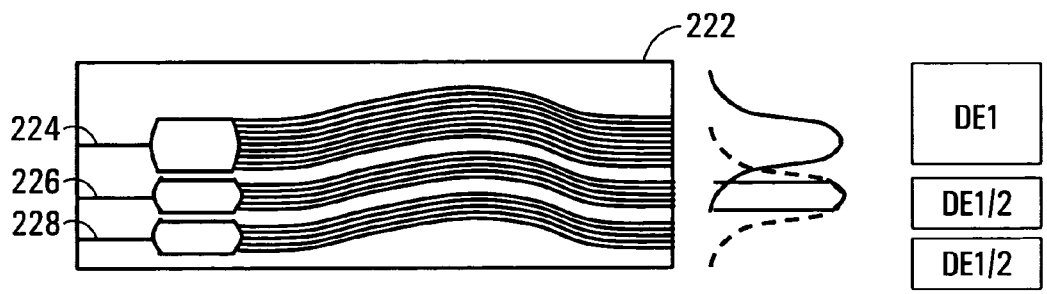

FIGS. 2A to 2C show examples of how integrated dispersive arrangements having differing performance characteristics can be produced. Referring first to FIG. 2A, shown is an example of a "full beamwidth" path that has slab waveguide 200 coupling to waveguide dispersive element 202, with beam shape cross-sectional characteristic 204. For the example of FIG. 2A, substantially all of the Gaussian beam profile is sampled at the interface between slab region 200 and arrayed waveguide region 202. For example, profile 204 represents the $2\omega$ ($\omega$ being the Gaussian waist of the beam) region.

Referring to FIG. 2B, shown is an example of a "reduced beamwidth" path that has slab waveguide 206 coupling to waveguide dispersive element 208, with light cross-sectional characteristic 210. The number of waveguides in the waveguide dispersive element 208 is half that of the waveguide dispersive element of FIG. 2A with the result that some of the light that is coupled out of slab waveguide 206 is lost. This example shows a truncated Gaussian beam 210 of width $\omega$.

Referring to FIG. 2C, shown is an example of an arrangement featuring a full beamwidth path 224 as described in FIG. 2A, and two reduced beamwidth paths 226,228 integrated onto a single waveguide device 222.

Figure 3A:
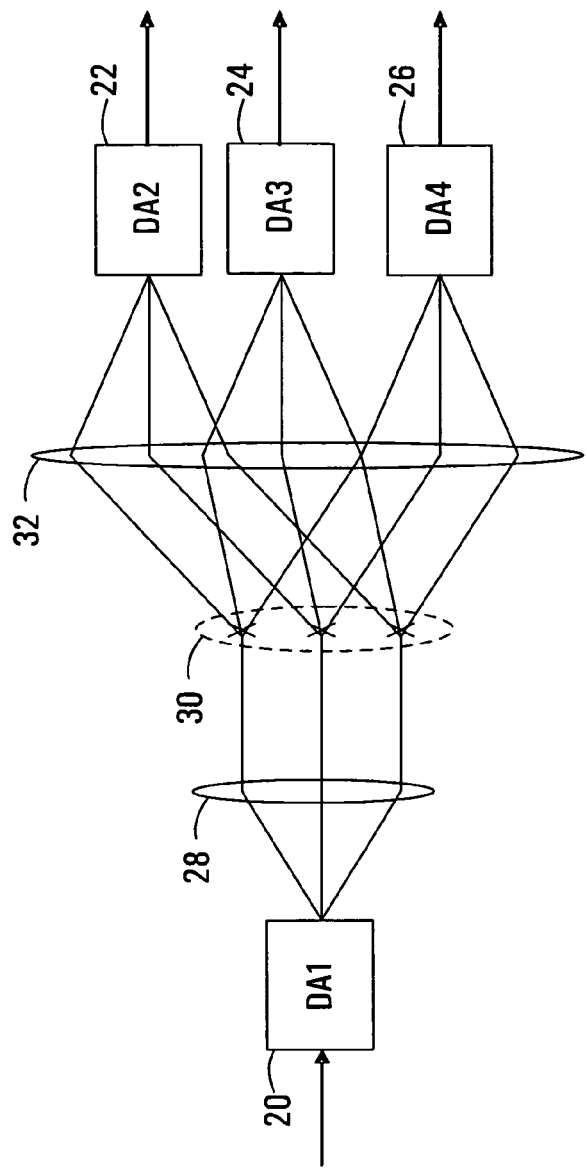
FIG. 3A is a block diagram of a WSS provided by an embodiment of the invention.

FIG. 3A is a block diagram of a WSS provided by an embodiment of the invention. There is a DA (dispersive arrangement) 20 associated with an input port, and DA's 22,24,26 each associated with a respective output port, three shown in the illustrated example. More generally, an arbitrary number of output ports is contemplated. Between the dispersive arrangement 20 of the input port and the dispersive arrangements 22,24,26 of the output ports is an arrangement that includes a routing lens, transmissive routing elements 30, and main lens 32. An N×M cross connect featuring such dispersive arrangements is provided by another embodiment of the invention.

Each dispersive arrangement includes a dispersive element, may include coupling optics and/or other elements such as lenses with different focal lengths, slab regions with different lengths, apertures clipping the beam, tapers changing beam dimensions, collimators changing beam dimensions, and beamforming optics changing beam dimensions etc.

At least two of the dispersive arrangements 20,22,24,26 associated with the ports have differing performance characteristics. In a particular embodiment, at least two of the dispersive arrangements 22,24,26 for the output ports have different performance characteristics.

In operation, the wavelength channels of a multi-wavelength signal entering the input port are demultiplexed by the dispersive arrangement 20. The separated wavelength channels are routed by routing lens 28 to routing elements 30, one per wavelength channel. Each routing element 30 is adjustable to route the wavelength channel via the main lens 32 to a selected one of the output ports via one of the dispersive arrangements 22,24,26, the dispersive arrangements 22,24,26 functioning to recombine any wavelength channels routed towards them.

Figure 3B:
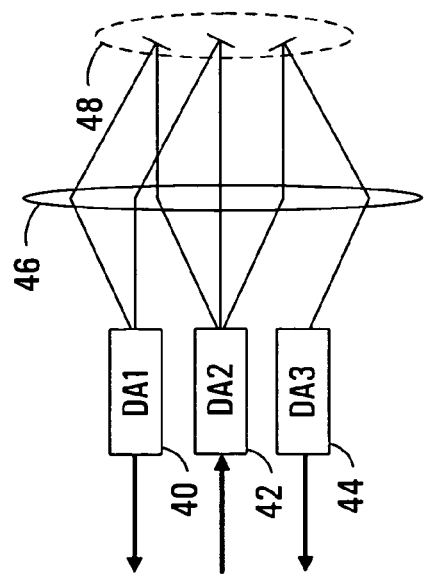
FIG. 3B is a block diagram of a WSS provided by an embodiment of the invention.

FIG. 3B is a block diagram of a WSS provided by another embodiment of the invention. The WSS of FIG. 3B is similar to that of FIG. 3A, but with reflective routing elements. There is a DA (dispersive arrangement) 42 associated with an input port, and DA's 40,44 each associated with a respective output port, two shown in the illustrated example. More generally, an arbitrary number of output ports is contemplated. In light transmission paths between the DA 42 of the input port and the dispersive arrangements 40,44 of the output ports is an arrangement that includes a main lens 46 and reflective routing elements 48. An N×M cross connect featuring such dispersive arrangements is provided by another embodiment of the invention.

Each dispersive arrangement includes a dispersive element, may include coupling optics and/or other elements such as lenses with different focal lengths, slab regions with different lengths, apertures clipping the beam, tapers changing beam dimensions, collimators changing beam dimensions, and beamforming optics changing beam dimensions etc.

At least two of the dispersive arrangements 40,42,44 associated with the ports have differing performance characteristics. In a particular embodiment, at least two of the dispersive arrangements 40,44 for the output ports have different performance characteristics.

In operation, the wavelength channels of a multi-wavelength signal entering the input port are demultiplexed by the dispersive arrangement 42. The separated wavelength channels pass through main lens 46 to routing elements 48, one per wavelength channel. Each routing element 48 is adjustable to route the wavelength channel via the main lens 46 to a selected one of the output ports via one of the dispersive arrangements 40,44, the dispersive arrangements 40,44 functioning to recombine any wavelength channels routed towards them.

Several detailed examples will now be provided with reference to FIGS. 4 to 9.

It is noted that in the embodiment of FIG. 4A described below, and in all other embodiments, the description deals specifically with dropping wavelength channels. Usually this involves a single input port and multiple output ports. Alternatively, these same embodiments can function to add wavelength channels simply by interchanging the roles of the ports. Thus for example, a one input port, four drop (output) port implementation can equally function as a one output port, four input (add) port implementation.

FIG. 4A shows a top view of a WSS 90 provided by an embodiment of the invention. FIG. 4B shows a side view of the embodiment of FIG. 4A. The arrangement has one high performance input port 102, two high performance output ports 100, 101, and two low performance output ports 103, 104. For example, each port might be a single mode optical fibre or a waveguide. Light is coupled between the ports 100,101,102,103,104 and a waveguide device 105 containing a respective waveguide dispersive element 111,112,113, 114,115 per port through integrated coupling optics 106,107, 108,109,110.

In the illustrated example, each waveguide dispersive element 111,112,113,114,115 consists of an arrayed waveguide grating having a predetermined path length variation spread across the array. Light exiting the dispersive element 113 for the input port 102 exhibits an angle dependent on the wavelength according to design parameters of the waveguide dispersive element 113.

The waveguide dispersive elements 111,112,113 for the high performance ports 100,101,102 have about twice the number of waveguides as the waveguide dispersive elements 114,115 for the low performance ports 103,104. The difference in performance between the high performance ports and the low performance ports is a design parameter that is selected on an implementation specific basis.

Also shown is a cylindrical collimating lens 106, main lens 108, and an array 123 of routing elements 124,126,128, 130,132 operable as described below. In some embodiments, there is a respective routing element per wavelength channel to be processed. These routing elements in one embodiment consist of tilting micro-mirrors used to redirect the light at a selectable angle.

Throughout this description, a wavelength channel is an arbitrary contiguous frequency band. A single wavelength channel might include one or more ITU wavelengths and intervening wavelengths for example. Even though the expression "$\lambda$" is referred to herein in respect of a wavelength channel, this is not intended to imply a wavelength channel is a single wavelength only.

In the illustrated example, the arrangement is shown processing five wavelength channels $\lambda_1, \lambda_2, \lambda_3, \lambda_4, \lambda_5$. An input DWDM light beam containing five wavelength channels $\lambda_1 \ldots \lambda_5$ is input to the arrangement 90 through input port 102. This passes through integrated coupling optics 108 to waveguide dispersive element 113 for the input port which produces a demultiplexed set of beams, each containing a respective wavelength channel. For ease of description, only two of the five demultiplexed wavelength channels (those for $\lambda_2, \lambda_3$) are shown in the portion of FIG. 4A to the right of waveguide device 105 although all five would be present at the exit of the waveguide dispersive element 113, assuming they were present in the input signal. The path of light for $\lambda_2$ is generally indicated at 140 and is shown as a solid line, while the path of light for $\lambda_3$ is generally indicated at 142 and is shown as a dashed line. The light beams 140,142 first traverse the cylindrical lens 106 which does not affect the light propagation in the plane of the figure, but substantially collimates the light in the perpendicular plane. The main cylindrical lens element 108 focuses the light in the plane of the paper, while not affecting light propagation in the perpendicular plane, making the demultiplexed light beams 140,142 incident upon routing elements 126,128 respectively.

After reflection from routing elements 126,128, the light beams 140,142 are focused in a plane perpendicular to the plane of the waveguide device 105 by cylindrical lens 106 and are collimated in the plane of the waveguide device 105 by cylindrical lens 108. In some embodiments, the lens 108 is arranged such that the end of the waveguide device 105 and the array of routing elements 123 are placed at the lens focal planes, guaranteeing that irrespective of the tilting angle of the routing elements 126,128, the angle of incidence of the light beams 140,142 when they couple back to the waveguide device 105 is substantially the same as the angle upon exit of the waveguide device 105. Therefore when the routing elements 126,128 are controlled in such a way that the light beams 140,142 are aligned with any of the waveguide dispersive elements 111,112,114,115, this construction allows for an efficient coupling and re-multiplexing of the light beams into exiting light beams coupled to the output ports 100,101,103,104. In the illustrated example, light beam 140 is redirected by routing element 126 back to the dispersive element 112 for one of the high performance ports 101. Light beam 142 is redirected by routing element 128 back to the dispersive element 115 for one of the low performance ports 104.

In a more general implementation, multiple wavelengths (even all of them) can be routed from the input port 102 to any given output port 100,101,103,104. In some embodiments, limitations are placed on the freedom of the routing elements 124,126,128,130,132 such that while any wavelength can be switched to the high performance ports 100,101, only a specific wavelength or wavelengths can be switched to the low performance ports 103,104.

In some embodiments, some of the dispersive elements (for example waveguide dispersive elements 111,112,113) have a different free spectral range compared with other dispersive elements (for example waveguide dispersive elements 114,115). This places further restrictions on the wavelength channels that can be routed to each output port. For example, dispersive elements 111,112,113 can be configured to process all wavelength channels of the C-band (by designing an FSR of for example 6 THz), while dispersive elements 114,115 can be designed with an FSR of 800 GHz to make them cyclical.

FIG. 4A shows waveguide dispersive elements in the form of an arrayed waveguide gratings. More generally, an embodiment like that of FIG. 4A can employ any suitable waveguide dispersive element. For example, one can use Echelle gratings etched into the waveguide.

FIG. 4A shows integrated coupling optics in the form of slab waveguides. In other embodiments, a micro-optics coupling scheme external to the waveguide device 105 can be employed. This might, for example, take the form of cylindrical lenses and/or and collimating lenses (not shown). Other micro-optics arrangements can employed, for example, gradient-index rod lens (Selfoc®, from NSG America) or other types of lens to the same effect.

FIG. 4A shows routing elements 124,126,128,130,132 in the form of a MEMS array. Alternatively one can use various other beam steering elements, such as liquid crystal beam steering elements, programmable diffraction gratings, phase arrays, tilting prisms, or moving lenses. More generally, routing elements can be employed. Routing elements may perform a dynamic switching function or may perform only a static routing function.

FIG. 4A shows a cylindrical lens 108 which performs routing between the dispersive elements and the routing elements. More generally, a bulk optical element having optical power can be employed. For the purpose of this description, a bulk optical element having optical power can be a curved mirror or a lens or a combination of curved mirrors and/or lenses. Various types of lenses can be employed for different applications. All the wavelength channels pass through the bulk optical element in the case of it being a lens, or reflect off the bulk optical element in the case of it being a curved mirror. In some embodiments, such as the embodiment of FIG. 4A, the wavelength channels all pass through the bulk optical element having optical power twice, once on the way towards the routing elements and once on the way back. In other embodiments, such as those featuring transmissive routing elements described below, there are multiple bulk optical elements having optical power. However, the constraint that all the wavelength channels to be routed pass through each bulk optical element having optical power remains the same.

To simplify the description of this embodiment, it is shown as being a four drop ROADM with five wavelength channels, although it is to be understood that different numbers of ports and different numbers of wavelength channels can be accommodated by proper design of the array of waveguide dispersive elements and array of routing elements. The number of wavelengths does not need to equal the number of ports.

In some embodiments, the cylindrical lens 108 is put substantially in-between the waveguide device 105 and the switching array 123 whereby the optical distance between the waveguide device 105 and the cylindrical lens 108 and the optical distance between the cylindrical lens 108 and the switching array 123 are each substantially equal to the effective focal length of the cylindrical lens 108. This system, known to one skilled in the art as a "4f system" is beneficial to obtain good coupling from and to the waveguide element 105 (telecentric imaging system). In some embodiments, lens 108 is a spherical lens. In other embodiments, lens 108 is a toroidal lens having optical power both in the plane of the FIG. 4A and in the plane perpendicular to the FIG. 4A.

In the above embodiment, the routing elements are set to direct substantially all the light of a given wavelength channel towards the selected output port. In another embodiment, one or more of the routing elements are adapted to controllably misdirect a given wavelength channel such that only part of the light is directed to the selected output port, the rest being lost. This allows a wavelength channel specific attention function to be realized. In yet another embodiment, one or more of the routing elements are adapted to misdirect a given wavelength channel such that substantially none of the light is directed to any output port. This results in a channel block capability. The modifications are also applicable to the below-described embodiments.

Referring now to FIG. 5A and the side view of FIG. 5B, another example implementation is shown. This example is very similar to the example of FIGS. 4A and 4B. In this case, the input port(s) and output ports are arranged in two rows 154 and 156 (shown in side view only), and for each row of ports there is a respective waveguide device 150,152 that is similar to the waveguide device 105 of FIG. 4A, containing a respective waveguide dispersive element per port. There is a respective collimating lens 151,153 for each waveguide device 150,152, and there is a main lens 155. With this embodiment, there is an array of routing elements 158 that are each capable of switching in two dimensions. Thus, a given wavelength channel can be switched in the "horizontal" direction from an input port of waveguide device 150 to an output port on the same waveguide device, or can be switched in the "vertical" direction (and horizontally) between an input port of waveguide device 150 and an output port of waveguide device 152. With the example of FIGS. 5A and 5B, each row of ports has three high performance ports and two low performance ports, similar to the arrangement of FIG. 4A. More generally, at least two rows of ports are provided, and the ports include ports with two different performance characteristics.

Figure 6A:
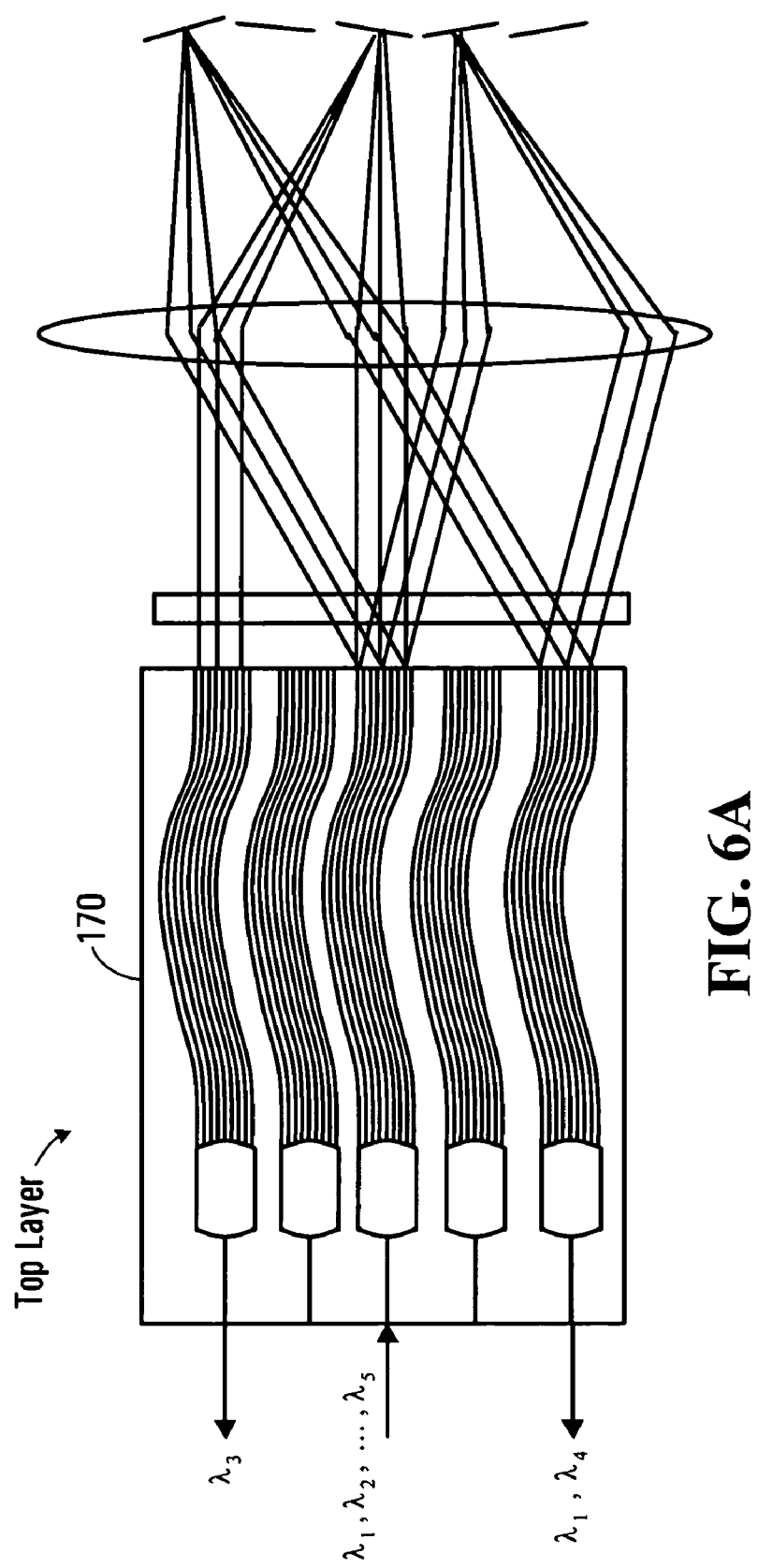
FIGS. 6A, 6B and 6C are schematic diagrams of a WSS provided by an embodiment of the invention.
Figure 6B:
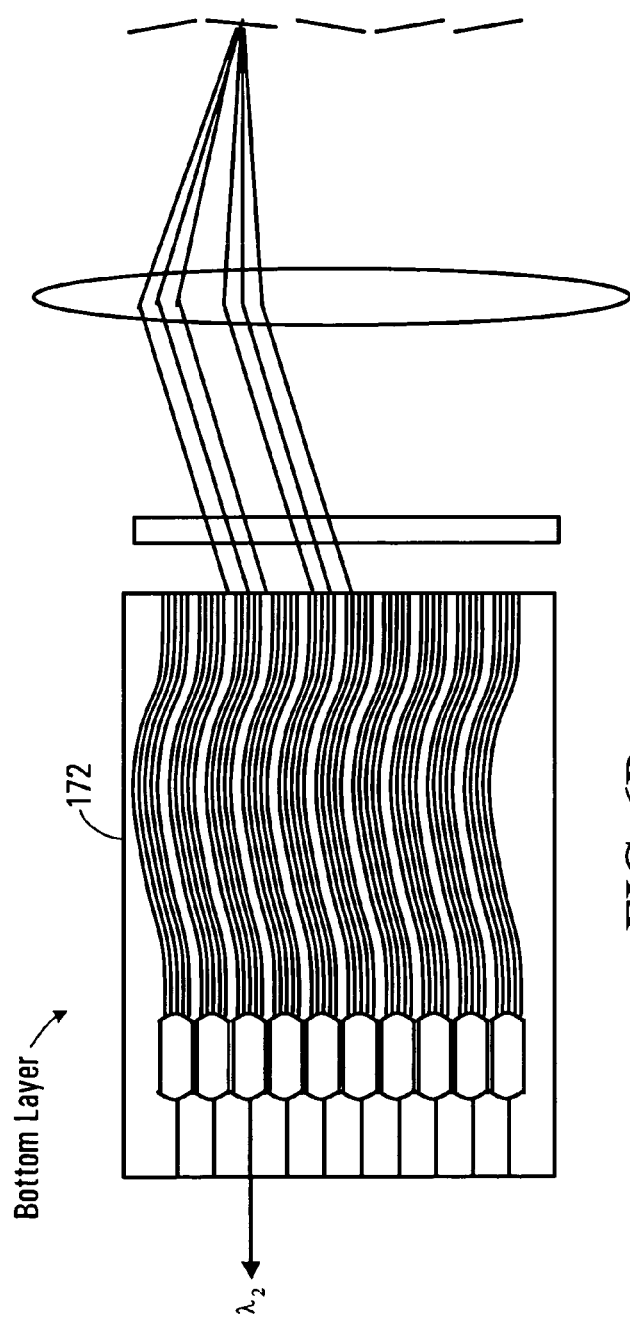
Figure 6C:
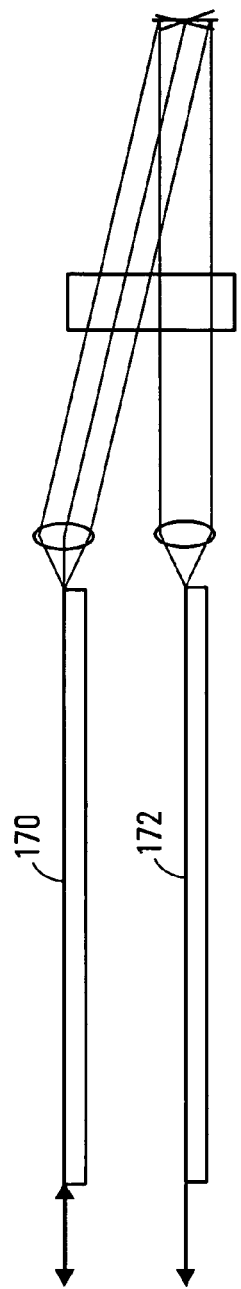

Referring now to FIGS. 6A, 6B and 6C, shown is another specific example of an implementation that allows switching in two dimensions. The arrangement has two waveguide devices 170 (shown only in FIGS. 6A and 6C) and 172 (shown only in FIGS. 6B and 6C) arranged in a similar manner to waveguide devices 150,152 of FIG. 5A, 5B such that the remainder of the Figures need not be described. With this embodiment, all of the waveguide dispersive elements in waveguide device 170 have high performance and are thus associated with high performance ports. All of the waveguide dispersive elements in waveguide device 172 have low performance and are thus associated with low performance ports. There are five high performance ports and ten low performance ports. Advantageously, having the high performance and low performance ports on different layers provides higher isolation (lower cross talk) between the high performance and low performance ports.

Figure 7:
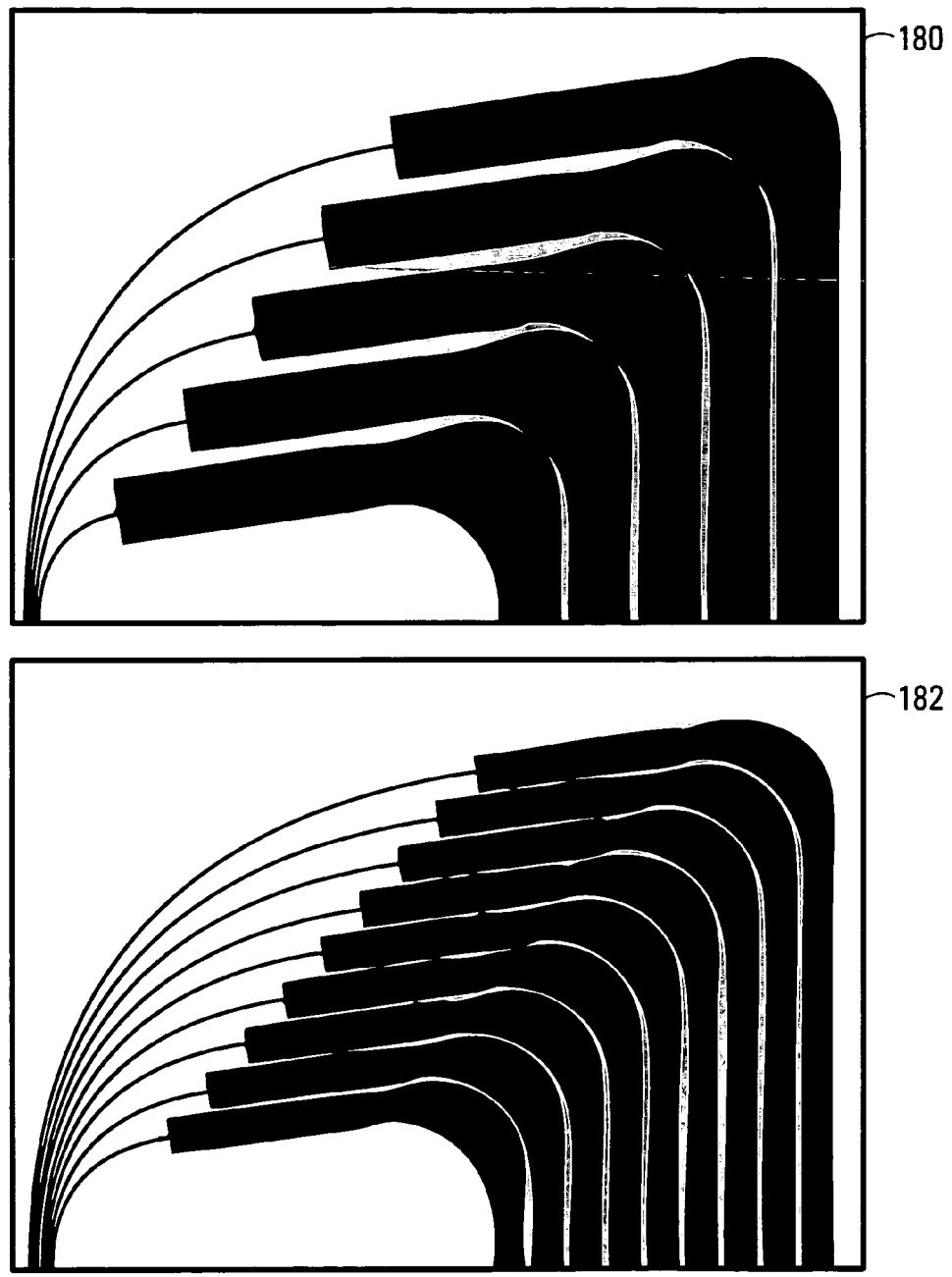
FIG. 7 illustrates mask designs that can be used to implement a 1×(4+9) WSS.

FIG. 7 shows an example of an actual mask design that can be used for a 1×(4+9) WSS, meaning one high performance input port, four high performance output ports, and nine low performance service ports. First and second waveguide devices 180,182 are shown. These might be arranged as shown for waveguide devices 150,152 in FIG. 5A for example. The first waveguide device 180 has five WSS capable waveguide based dispersive elements and the second waveguide device 182 has nine waveguide dispersive elements for colourless (i.e. wavelength non-specific) service ports. In the illustrated example, the waveguide array design in both waveguide devices 180,182 is identical (waveguide spacing in the array, order, Δl, slab length, waveguide taper to slab, centre wavelength), but in the case of waveguide device 182 the number of guides per dispersive element is reduced to 181 compared to 365 in waveguide device 180, therefore only sampling the central portion of the beam emitted by the waveguide coupled to the device (see FIGS. 2A to 2C described above). Since the number of waveguides is halved, the waveguide dispersive elements can be arranged closer to each other in waveguide device 182 than in waveguide device 180 (for example port spacing 2.5 mm in waveguide device 182 and 4.5 mm in waveguide device 180) such that the dies used for waveguide devices 180,182 can have the same physical dimensions but there are nine ports in waveguide device 182 and five in waveguide device 180. This results in the same waveguide cost for nine ports as for five therefore enabling cost differentiation and performance differentiation per port.

The main performance degradation of the low performance ports of waveguide device 182 compared to the high performance one ones of waveguide device 180 in this particular design is the lower port to port isolation between the low resolution ports and a small penalty in insertion loss.

It is readily apparent how the above described designs can be generalized to implement 1×(K+M) design, featuring a single high performance input port, K high performance output ports and M reduced performance output ports.

Figure 8:
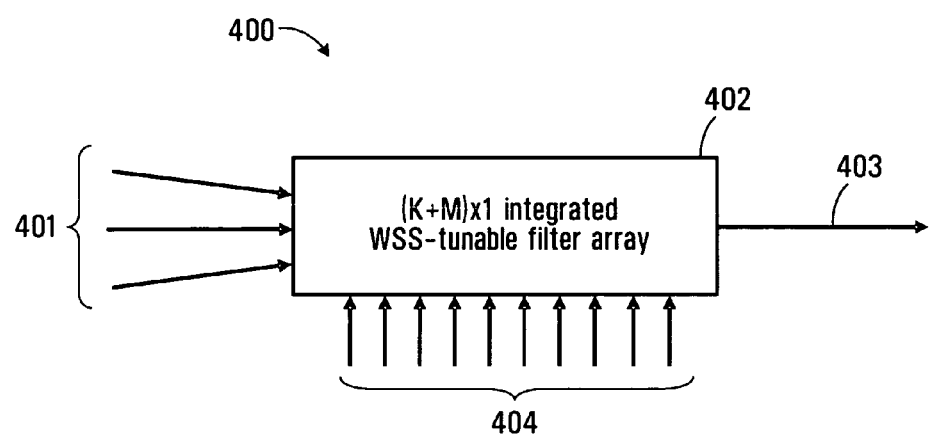
FIG. 8 is a logical diagram of a (K+M)×1 integrated WSS-tunable filter array.

The same design approach can be used to provide a device that effectively is operated in reverse to provide a (K+M)×1 design, such as depicted logically in FIG. 8. In the particular example shown, there are K=3 high performance input ports 401, M=10 reduced performance input ports 404, and a single high performance output port 403.

In an example application of the arrangement of FIG. 8 operating within an optical system, high performance ports 401 could be used for all-optical interconnection to the rest of the network (various directions in a mesh network topology) whereas low performance ports 404 could be used for local colourless add, for example to add a single respective wavelength channel at each low performance port.

Figure 9:
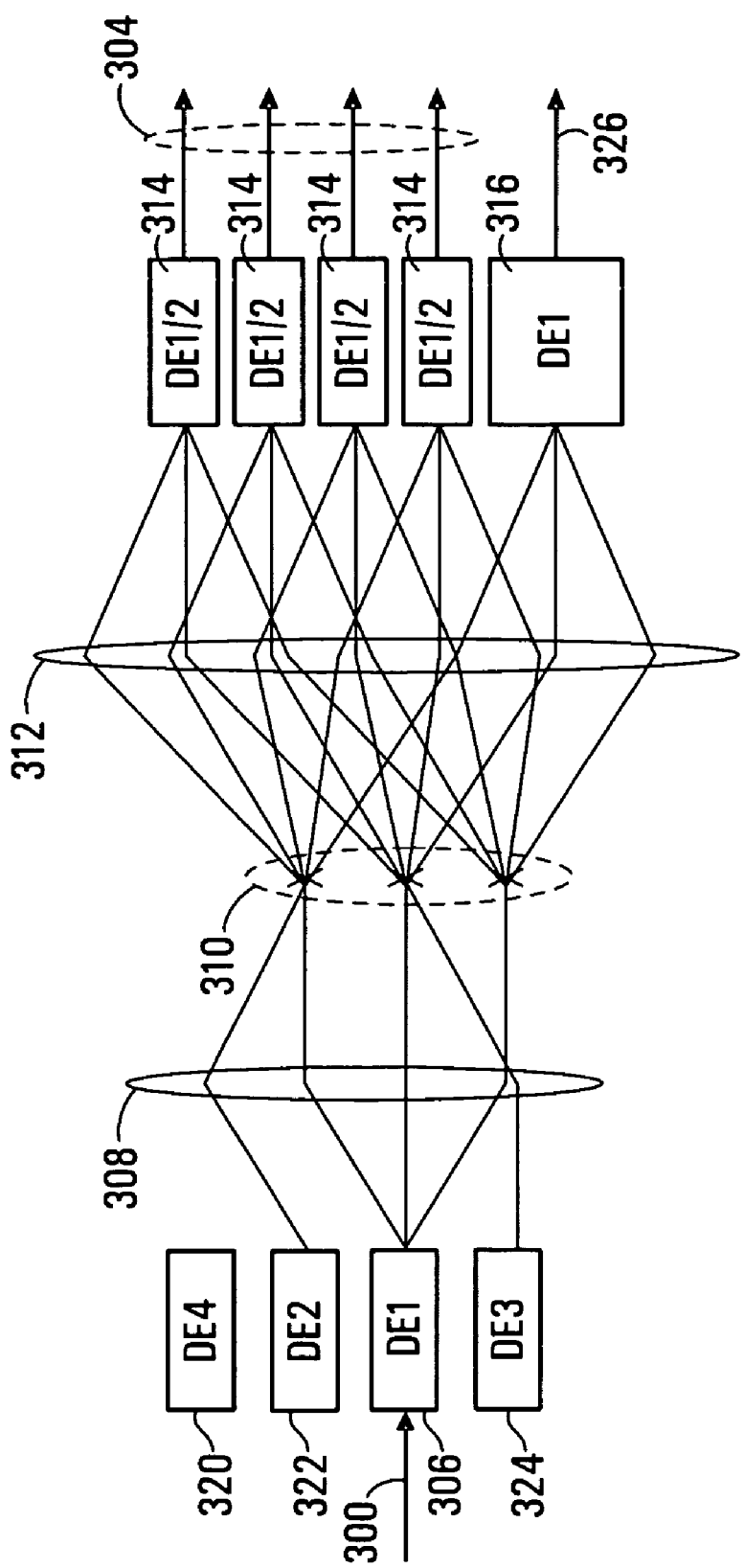
FIG. 9 is a block diagram of a WSS with transmissive routing elements and/or bulk dispersive elements per port.

FIG. 9 shows another embodiment in which transmissive routing elements are used. Input port 300 couples light into full performance dispersive element 306 where wavelength demultiplexing takes place. Lens 308 routes demultiplexed beams to transmissive routing elements 310 that individually switch each wavelength channel towards a selected output port 304,306 via lens 312 and dispersive elements 314,316. In the illustrated example, the output ports consist of four half performance output ports 304 having associated half performance dispersive elements 314, and a single full performance output port 326 having associated full performance dispersive element 316. Also shown are dispersive elements 320,322,324 for other input ports.

The above-described embodiments have referred to wavelength selective switches. Such arrangements feature an input x output port arrangement that is 1×N or N×1. More generally, embodiments are applicable to a wavelength cross connect. A wavelength cross connect has an input x output port arrangement that is M×N. A wavelength selective switch is a special case of a wavelength cross connect in which either M or N is one.

The above-describe embodiments have been described as though the input ports and output ports have dedicated functions. More generally, in some embodiments at least one port is provided that functions as both an input port and an output port, for example by providing an appropriate decoupling mechanism, such as a circulator to separate input signals from output signals. As a specific example of this, the embodiment of FIG. 3B, the input port having dispersive arrangement 42 could function as an output port as well by the inclusion of a circulator. In that case, the routing elements 48 would re-direct each wavelength channel back to any of the three dispersive arrangements 40,42,44.

In some embodiments, for at least one port, coupling optics are provided for tapping a portion of a signal being input or output at that port. A detector is provided to detect the portion of the signal being tapped off. This may be useful for ports that are configured to receive or output a single wavelength channel, and optical performance monitoring can be performed for such a channel.

For the embodiments described, the routing elements switch the entirety of the optical power of a given wavelength channel. More generally, in some embodiments, beam processing elements are provided for re-directing at least part of the wavelength channel between the dispersive arrangement(s) of the at least one input port and the dispersive arrangement(s) of the at least one output port. An example of a beam processing function that might be implemented in such a beam processing element is an attenuation beam processing function. Other beam processing functions are possible.

Numerous modifications and variations of the present invention are possible in light of the above teachings. It is therefore to be understood that within the scope of the appended claims, the invention may be practiced otherwise than as specifically described herein.

We claim:

1. A wavelength cross connect comprising:
   at least one waveguide device;
   at least one input port, each input port for launching an input optical signal including at least one wavelength channel into the at least one waveguide device;
   for each input port, a respective input dispersive arrangement, including an arrayed waveguide grating for dispersing the input optical signals out of the at least one waveguide device according to wavelength;
   a plurality of output ports for outputting selected wavelength channels from the at least one waveguide device;
   for each output port, a respective output dispersive arrangement, including an arrayed waveguide grating, that multiplexes any wavelength channels re-directed towards the respective output dispersive arrangement; and
   a plurality of routing elements separate from the at least one waveguide device for re-directing wavelength channels between the at least one input dispersive arrangement and any one of the plurality of output dispersive arrangements;
   wherein at least two of the output ports are configured to have differing performances through selection of respective dispersive arrangements having differing characteristics; and
   wherein the differing characteristics are selected from the group consisting of: arrayed waveguide gratings having at least two different path length differences; arrayed waveguide gratings having at least two different waveguide spacings in a waveguide array output facet; arrayed waveguide gratings having at least two differing numbers of waveguides lit; and slab waveguides that truncate a beam emitted in a front slab region in a dispersive arrangement so that only a central portion of the beam couples to the arrayed waveguide grating.

2. The wavelength cross connect of claim 1, wherein the at least one output port includes four output ports, and wherein at least two of the output ports are configured to have differing performances than two other of the output ports through selection of respective dispersive arrangements having differing characteristics.

3. The wavelength cross connect of claim 1, wherein the at least one input port comprises a plurality of input ports, and wherein at least two of the input ports are configured to have differing performances through selection of dispersive arrangements having differing characteristics
wherein the differing characteristics are selected from the group consisting of: arrayed waveguide gratings having at least two different path length differences; arrayed waveguide gratings having at least two different waveguide spacings in a waveguide array output facet; arrayed waveguide gratings having at least two differing numbers of waveguides lit; and slab waveguides that truncate a beam emitted in a front slab region in a dispersive arrangement so that only a central portion of the beam couples to the arrayed waveguide grating.

4. The wavelength cross connect of claim 1, wherein the at least one input port comprises 1 input port; and the at least one output port comprises K full resolution output ports, and M reduced resolution output ports, where $K \geq 1$, $M \geq 1$.

5. The wavelength cross connect of claim 1, wherein the at least one input port comprises K full resolution input ports, M reduced resolution input ports, and a single output port, where $K \geq 1$, $M \geq 1$.

6. The wavelength cross connect of claim 3, wherein the input and output dispersive arrangements comprise a plurality of arrayed waveguide gratings implemented on a single waveguide device.

7. The wavelength cross connect of claim 3, wherein the input and output dispersive arrangement comprise a plurality of arrayed waveguide gratings implemented on two superposed waveguide devices; wherein the routing elements are switchable in two dimensions.

8. The wavelength cross connect of claim 7 wherein the two waveguide devices comprise a first waveguide device having arrayed waveguide gratings with a first performance, and a second waveguide device having arrayed waveguide gratings with second performance different from said first performance.

9. The wavelength cross connect of claim 8 wherein the first and second waveguide devices are substantially physically the same size, but with differing numbers of arrayed waveguide gratings on the two devices.

10. The wavelength cross connect of claim 1, wherein the differing performances of the input and output ports are such that at least one of the input and output dispersive arrangements is configured to process a DWDM multiplex and at least one of the input and output dispersive arrangements is configured to produce a reduced set of wavelength channels.

11. The wavelength cross connect of claim 10, wherein the reduced set of wavelength channels consists of a single wavelength channel.

12. The wavelength cross connect of claim 1, further comprising: a lens system between the at least one waveguide device and the routing elements to optically connect the input and output dispersive arrangements and the routing elements; each input and output dispersive arrangement is selected on a per port basis with a dispersive characteristic selected to compensate for aberrations in the lens system.

13. The wavelength cross connect of claim 1, further comprising: for each of at least one input and output port, coupling optics and a detector, the coupling optics being configured to route part of the light being input/output at the input and output port to the detector.

14. The wavelength cross connect of claim 1, wherein at least one input port functions as both an input port and an output port.

15. The wavelength cross connect of claim 14, further comprising a circulator for each port functioning as both an input port and an output port to separate input and output signals.

16. A wavelength cross connect comprising:
a first input port for launching an input optical signal including a plurality of wavelength channels;
a plurality of at output ports for outputting at least a portion of at least one of the wavelength channels;
first dispersing means, having a first performance, for the first input port for dispersing the input optical signal according to wavelength;
second dispersing means, having a second performance, for at least one of the output ports that multiplexes any wavelength signals re-directed towards the second dispersive means;
third dispersing means, having a third performance different than the second performance, for at least one of the output ports that multiplexes any wavelength signals re-directed towards the third dispersing means; and
beam processing elements for re-directing at least part each of the wavelength channels between the first dispersive means and one or more of the second and third dispersive means.

17. The wavelength cross connect of claim 16, further comprising:
a second input port for launching an input optical signal including at least one wavelength channel; and
fourth dispersing means, having a fourth performance different than the first performance, for dispersing the input optical signal from the second input port according to wavelength towards the beam processing elements for redirection to the second and third dispersive means.

18. The wavelength cross connect of claim 16, wherein the first, second and third dispersive means each comprise an arrayed waveguide grating; and wherein the different characteristics are selected from a group consisting of: arrayed waveguide gratings having at least two different path length differences; arrayed waveguide gratings having at least two different waveguide spacings in a waveguide array output facet; and arrayed waveguide gratings having at least two differing numbers of waveguides lit.

19. The wavelength cross connect of claim 16, wherein the first, second and third dispersive means each comprise a bulk optical diffraction grating; wherein the different characteristics are selected from a group consisting of: bulk optical diffraction gratings having at least two different orders; bulk optical diffraction gratings having at least two different line/mm characteristics; and bulk optical diffraction gratings having at least two differing numbers of grooves lit.

20. A wavelength cross connect comprising:
at least one waveguide device;
a plurality of input ports, each input port for launching an input optical signal including at least one wavelength channel into the at least one waveguide device;
for each input port, a respective input dispersive arrangement, including an arrayed waveguide grating for dispersing the input optical signals out of the at least one waveguide device according to wavelength;
at least one output port for outputting selected wavelength channels from the at least one waveguide device;
for each output port, a respective output dispersive arrangement, including an arrayed waveguide grating, that multiplexes any wavelength signals r-edirected towards the respective output dispersive arrangement; and a plurality of routing elements separate from the at least one waveguide device for re-directing wavelength channels between the at least one input dispersive arrangement and the at least one output dispersive arrangement;

wherein at least two of the input ports are configured to have differing performances through selection of respective dispersive arrangements having differing characteristics; and wherein the differing characteristics are selected from the group consisting of: arrayed waveguide gratings having at least two different path length differences; arrayed waveguide gratings having at least two different waveguide spacings in a waveguide array output facet; arrayed waveguide gratings having at least two differing numbers of waveguides lit; and slab waveguides that truncate a beam emitted in a front slab region in a dispersive arrangement so that only a central portion of the beam couples to the arrayed waveguide grating.

* * * * *